(12) United States Patent
Abbas et al.

(10) Patent No.: US 12,026,120 B2
(45) Date of Patent: Jul. 2, 2024

(54) SHARING HIGH SPEED SERIAL INTERCONNECTS FOR DIFFERENT PROTOCOLS

(71) Applicant: Cornami, Inc., Campbell, CA (US)

(72) Inventors: Fazal Abbas, Campbell, CA (US); Paul L. Master, Campbell, CA (US)

(*) Notice: Subject to any disclaimer, the term of this patent is extended or adjusted under 35 U.S.C. 154(b) by 38 days.

(21) Appl. No.: 17/845,717

(22) Filed: Jun. 21, 2022

(65) Prior Publication Data

US 2023/0409509 A1  Dec. 21, 2023

(51) Int. Cl.
*G06F 13/42* (2006.01)

(52) U.S. Cl.
CPC .. *G06F 13/4282* (2013.01); *G06F 2213/0008* (2013.01); *G06F 2213/0026* (2013.01)

(58) Field of Classification Search
CPC ......... G06F 13/4282; G06F 2213/0008; G06F 2213/0026
See application file for complete search history.

(56) References Cited

U.S. PATENT DOCUMENTS

| | | | | |
|---|---|---|---|---|
| 7,403,035 B1* | 7/2008 | Shumarayev | .... | H03K 19/17784 326/86 |
| 8,700,825 B1* | 4/2014 | Singh | ............. | H03K 19/17758 710/60 |
| 9,742,689 B1* | 8/2017 | Wang | .................... | H04L 7/0054 |
| 11,388,270 B1* | 7/2022 | Soma | ...................... | H04L 69/18 |
| 2014/0016637 A1* | 1/2014 | Masood | ................. | H04L 49/25 370/390 |
| 2016/0119075 A1* | 4/2016 | Gareau | ............... | H04J 14/0227 398/58 |
| 2017/0070295 A1* | 3/2017 | Remein | ............... | H04J 14/0282 |
| 2020/0162586 A1* | 5/2020 | Li | .......................... | H04L 69/24 |

* cited by examiner

*Primary Examiner* — Henry Tsai
*Assistant Examiner* — Harry Z Wang
(74) *Attorney, Agent, or Firm* — NIXON PEABODY LLP

(57) ABSTRACT

A system and method to allocate serial interconnection lanes on a die to multiple communication protocols is disclosed. The die has at least one processing core. The die incudes a first communication subsystem including a controller, a protocol coding sublayer (PCS) for interchanging data, and a data interface coupled to the core. The die includes a second communication subsystem including a controller, a PCS for interchanging data, and a data interface coupled to the core. A mode input selects at least one of the first or second communication protocol. A data router has an input coupled to the PCS of the first communication subsystem and an input coupled to the PCS of the second communication subsystem. The data router has an output coupled to the set of serial interconnection lanes, and a selection input coupled to the mode input to allocate some of the lanes for the selected protocol.

20 Claims, 9 Drawing Sheets

| Die_x_sedes_mode_pins | PMA Macro3 X4 | PMA Macro2 X4 | PMA Macro1 X4 | PMA Macro0 X4 | Comment | Relevant Design |
|---|---|---|---|---|---|---|
| 4'b0000 | PCIe | PCIe | PCIe | PCIe | X16 PCIe | 4 Die |
| 4'b0001 | - | CAUI-4 | ILKN_L | ILKN_L | X8 ILKN_L X4 CAUI | 4 Die |
| 4'b0010 | INLK_L | ILKN_L | ILKN_H | ILKN_H | 2 (x8 ILKN) | 4 Die |
| 4'b0011 | ILKN_H | ILKN_H | ILKN_L | ILKN_L | 2 (x8 ILKN) | 4 Die |
| 4'b0100 | ILKN_H | ILKN_H | ILKN_H | ILKN_H | 2 (x8 ILKN) | 4 Die |
| 4'b0101 | - | - | ILKN_H | ILKN_H | X8 ILKN | 4 Die |
| 4'b0110 | - | CAUI-4 | - | - | CAUI4 | 2 Die/ 4 Die |
| 4'b0111 | ILKN_L | ILKN_L | PCIe | PCIe | X8 PCIe X8 ILKN_L | 2 Die |
| 4'b1000 | ILKN_L | CAUI-4 | PCIe | PCIe | X8 PCIe X4 ILKN_L X4 CAUI-4 | 1 Die |
| Other codes | Reserved | Reserved | Reserved | Reserved | - | - |

FIG. 5A

| Reach Mode Pins/Control Status Register (CSR) bits | Reach | Comment |
|---|---|---|
| 4'B000 | Ultra-Short | 3D Packaging |
| 4'B001 | Very-Short | 2.5D Packaging |
| 4'B010 | Medium | Intra-Board Package to Package |
| 4'B011 | Long | Board to Board/Backplane |
| 4'B100 | Ultra-Long | Server to Server/Rack to Rack |
| Other Codes | Reserved | |

FIG. 5B

SHARING HIGH SPEED SERIAL INTERCONNECTS FOR DIFFERENT PROTOCOLS

TECHNICAL FIELD

The present disclosure relates generally to communication interfaces for multi-core systems. More particularly, aspects of this disclosure relate to reducing the required high speed serial interconnection lines by sharing such lines between different communication protocols for a die with an array of cores.

BACKGROUND

Computing systems based on homogeneous cores that may be configured for different functions are increasing in popularity. Thus, such systems may be adapted for many different operations. Such cores may be fabricated so they may be divided to allocate the needed processing power. These cores may be configured to communicate with external devices using different communication protocols.

In order to exchange information, chips having processing cores must devote a certain amount of area to interconnections accessible by the cores. As chips increase in processing capability, the need for rapid exchange of data requires larger busses and therefore more interconnection area on a die. The dedication of surface area to communication interconnections trades off with the useful area for processing cores and other components.

One solution has been the use of high-speed serial interconnections such as the Serializer/Deserializer (SERDES) protocol. Interconnections such as SERDES provide serial data interfaces in each direction between two devices. SERDES interconnections provide data transmission over a single line or a differential pair in order to minimize the number of input/output pins and interconnects. Thus, serial interconnections take up less board space than parallel busses due to the decreased numbers of lines that are required.

However, in order to be flexible, different interconnections are required for dedication to all possible protocols that a chip may have to operate in. For example, a generic core may have to have the option to operate in PCIe Express Gen 4.00, 100 GBs Ethernet, Interlaken, Quick Path Interconnect (QPI, Intel Version), Infiniti Fabric (AMD) high speed serial connection, NV Link (Invidia) chip to chip communication or Universal Chiplet Interconnect Express (UCIE) SERDES Interconnection 2.5/3D protocols among others. Each of these protocols requires its own specialized controller as well as dedicated serial interconnections. The number of required serial interconnections for the desired flexibility in terms of operations in each protocol consumes space on the die.

SERDES lanes take a significant amount of chip area and consume significant power. For example, the above described support for the differing protocols requires multiple SERDES lines dedicated to each of the potential protocols. The PCIe Express Gen 4.00 protocol requires either 8, 16, or 32 SERDES lanes. Other PCIe Express protocols may require up to 64 SERDES lanes. The 100 GBs Ethernet requires 4 SERDES lanes and the Interlaken protocols require 16 SERDES lanes. The Quick Path Interconnect requires 20 SERDES lanes. The Infiniti Fabric high speed serial connection requires 16 or 32 SERDES lanes. The NV Link (Invidia) chip to chip communication requires 50 SERDES lanes. The Universal Chiplet Interconnect Express protocol requires 16 SERDES lanes. Thus, in order to support three different communication protocols, such as PCIe, Ethernet, and Interlaken, up to 36 or more SERDES lanes are required for the example device. Other combinations of communications protocols may require yet even more SERDES lanes.

Thus, there is a need to reduce the number of SERDES lanes for multi-core chips and multi-chiplet packages by using common SERDES lanes for different communication protocols. There is another need for a multi-core die that allows SEREDES lanes to be shared between different protocols for communication to external devices. There is another need for a system that allows the configuration of SERDES lanes between different protocols based on coded inputs.

SUMMARY

One disclosed example is a die operable to access multiple communication protocols. The die includes at least one processing core, a set of serial interconnection lanes and a first communication subsystem. The communication subsystem includes a controller, a protocol coding sublayer (PCS) for interchanging data in a first communication protocol, and a data interface coupled to the at least one core. The die also includes a second communication subsystem including a controller, a PCS for interchanging data in a second communication protocol, and a data interface coupled to the at least one core. The die includes a mode input to select at least one of the first or second communication protocol. The die includes a data router having an input coupled to the PCS of the first communication subsystem and an input coupled to the PCS of the second communication subsystem. The data router has an output coupled to the set of serial interconnection lanes, and a selection input coupled to the mode input to allocate at least some of the lanes of the set of serial interconnection lanes for the selected protocol.

Another disclosed example is a chip having a plurality of dies. Each of the dies include at least one processing core and a set of serial interconnection lanes. Each of the dies include a first communication subsystem and a second communication subsystem. The first communication subsystem includes a controller, a protocol coding sublayer (PCS) for interchanging data in a first communication protocol, and a data interface coupled to the at least one core. The second communication subsystem includes a controller, a PCS for interchanging data in a second communication protocol, and a data interface coupled to the at least one core. Each of the dies include a mode input to select at least one of the first or second communication protocol. Each of the dies include a data router having an input coupled to the PCS of the first communication subsystem and an input coupled to the PCS of the second communication subsystem, an output coupled to the set of serial interconnection lanes, and a selection input coupled to the mode input to allocate some of the lanes of the set of serial interconnection lanes for the selected protocol.

Another disclosed example is a method of allocating a set of serial interconnection lanes on a die having at least one processing core between a first and a second communication protocol. The die includes a first communication subsystem including a controller, a protocol coding sublayer (PCS) for interchanging data in a first communication protocol, and a data interface coupled to the at least one core. The die also includes a second communication subsystem including a controller, a PCS for interchanging data in a second communication protocol, and a data interface coupled to the at least one core. A mode configuration signal is input to a data router having an input coupled to the PCS of the first communication subsystem and an input coupled to the PCS of the second communication subsystem, and an output coupled to the set of serial interconnection lanes. At least some of the lanes of the set of serial interconnection lanes are allocated for the selected protocol. Data is exchanged via either the controller of the first subsystem or the controller of the second subsystem through the allocated lanes of the set of serial interconnection lanes with the processing core.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 5A is a table of different configuration modes of the SERDES lanes for one of the dies of the quad die chip in FIG. 2A;

FIG. 5B is a table of different reach configuration modes for the SERDES lanes for one of the dies of the quad die chip in FIG. 2A.

Figure 1A:
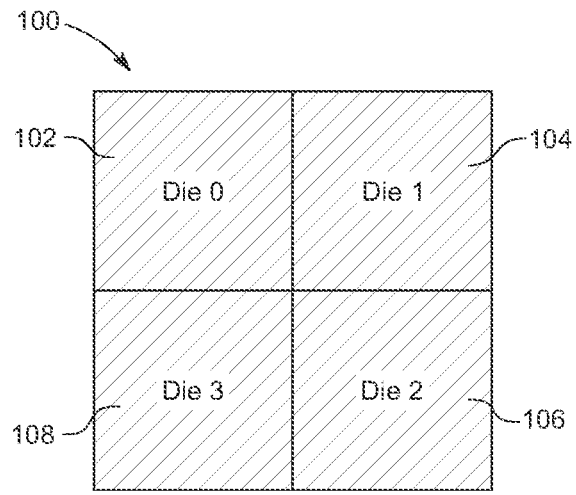
FIG. 1A is a block diagram of a chip having four dies, each having a set of SERDES interconnection lanes.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward providing a shared generic serial interconnection such as SERDES for a multi-core die. The shared two or more SERDES lanes reduce the power and chip area that is required for serial interconnections the SERDES lanes support different communication protocols. Thus, two, four, eight, sixteen, thirty-two or more SERDES lanes may be shared. One example of a flexible core may be a device that allows many different type of communication protocol interfaces that all use SERDES interconnections. For example, a die may require multiple communication interfaces such as a PCIe Express GEN4.0 (host connection B2B or C2C) interface, a 100 Gbs Ethernet CAUI-4 (B2B through Cable) interface, and an Interlaken interconnection (C2C) interface or other types of interfaces.

Based on the architecture of the device, not all of the above communication protocols must be used on all of the dies in an example chip with four dies. Thus, for the protocols that are not used, SERDES lanes for such unused protocols are unnecessary. Sharing SERDES lanes between the protocols thus reduces both power consumption and area required for SERDES lanes on the die. In addition, the SERDES lanes may be configured for different reach distances depending on the die architecture. Having the ability of turning the shared SERDES lanes between different reach distances allows for reducing power consumption or increasing communication bandwidth for the SERDES lanes.

FIG. 1A shows an example chip 100 that is subdivided into four identical dies 102, 104, 106, and 108. The dies 102, 104, 106, and 108 may be on a single monolithic wafer that is diced into individual ICs, or the dies can be placed onto another substrate, or the dies can be vertically stacked on each other (e.g., 2.5D packaging or 3D packaging). Each of the dies 102, 104, 106, and 108 include multiple processor cores, support circuits, serial interconnections and serial data control subsystems. For example, the dies 102, 104, 106, and 108 may each have 4,000 processing cores as well as sixteen or thirty-two or more SERDES lanes to support different communication protocols. There are die to die parallel connections between the dies 102, 104, 106 and 108. Thus, each of the dies 102, 104, 106, and 108 are interconnected by Interlaken connections and may be connected to dies of another chip or an FPGA. The chip 100 is designed to allow one, two or all four of the dies 102, 104, 106, and 108 to be used. The pins on a package related to unused dies are left unconnected in the package or the board. The dies are scalable as additional chips identical to the chip 100 may be implemented in a device or a circuit board.

Each of the dies 102, 104, 106, and 108 may contain multiple SERDES lanes that may be configured to support each of the different communication protocols. As will be explained the number of common SERDES lanes is selected based on the maximum number of SERDES lanes required for each of the protocols. In this example, each die 102, 104, 106, and 108 contains 16 SERDES lanes as the PCIe protocol requires 16 SERDES lanes, while the other two protocols require fewer lanes. Other types of dies or chip configurations may contain 32 or more SERDES lanes. The 16 SERDES lanes in this example can be configured to support any one of three separate communication protocols supported by the die. Dies with 32 SERDES lanes may also support any one of the three separate communication protocols in this example or other additional types of protocols. In this example, the three supported protocols are PCIe, CAUI-4 (100 Gbs Ethernet), and INTERLAKEN. Of course, other protocols such as USB 3.0, USB3.1, display port, CSIX, HDMI, Quick Path Interconnect (QPI, Intel Version), Infiniti Fabric (AMD) high speed serial connection, NV Link (Invidia) chip to chip communication or Universal Chiplet Interconnect Express (UCIE) SERDES Interconnection 2.5/3D protocols, and other variations and speeds of Ethernet such as 25G Base-R, 25 GAUI C2C, 25 GAUI C2M, CAUI-4 C2C, CAUI-4 C2M, 40 GBase-R, 100 GBase-R, XLAUI C2C, CAUI-10 C2C, XLAUI C2M, CAUI-10 C2M, XLPPI, CPPI, 10 GBase-KR, 40 GBase-KR4, 1000Base-KX, 10 GBase-KX4, and XAUI may be supported.

Figure 1B:
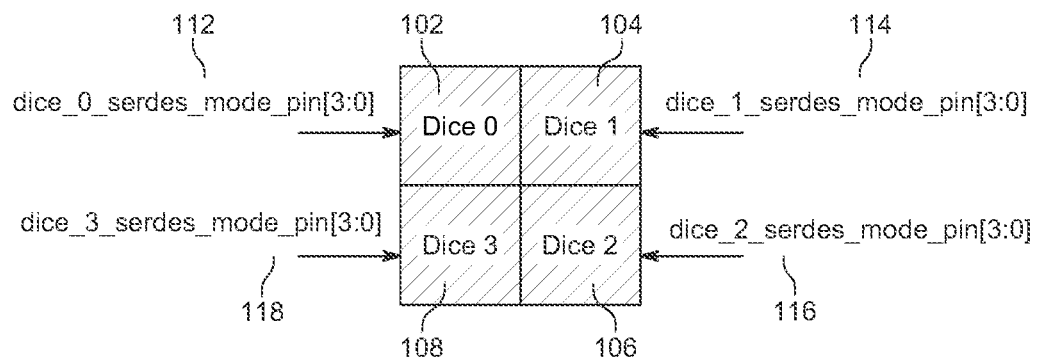
FIG. 1B is a block diagram of the chip in FIG. 1A that shows the configuration ports for the SERDES lanes for each of the dies.

FIG. 1B shows the input pin configurations to share the SERDES lanes for the example chip 100 shown in FIG. 1A between different controllers for the communication protocols on each of the dies 102, 104, 106, and 108. Each of the dies 102, 104, 106, and 108 has a corresponding four bit straps mode set of pins 112, 114, 116, 118 (die_x_serdes_mode_pin [3:0]) to configure the SERDES subsystem on the respective die 102, 104, 106, and 108. This allows sharing the SERDES lanes for specific communication protocols. In this example, there are four pins in each set of mode pins allowing for up to 16 different configurations for the SERDES lanes on the particular die among the communications protocols that are supported by each of the dies 102, 104, 106, and 108. Thus, certain configurations may allocate all 16 SERDES lanes to one protocol, such as the PCIe protocol. Another configuration may allocate 4 SERDES lanes to the Ethernet protocol, and 8 SERDES lanes to the Interlaken protocol, with 4 unused SERDES lanes. Thus, any combination of the 16 SERDES lanes may be allocated to one, two or all of the example communications protocols depending on the configuration setting. Additional control bits may be added for additional configurations. The configurations may also include other types of communication protocols with corresponding numbers of SERDES lanes. For example, the Quick Path Interconnect (QPI, Intel Version) may user 20 SERDES lanes, the Infiniti Fabric (AMD) high speed serial connection protocol may use 16 or 32 SERDES lanes, the NV Link (Invidia) chip to chip communication protocol may use 50 SERDES lanes, and the Universal Chiplet Interconnect Express (UCIE) SERDES Interconnection 2.5/3D protocol may use 16 SERDES lanes. Further, rather than using the straps set of pins, the modes may be implemented in a control status bit of the dies that is setup by software or non-volatile memory or some combination thereof.

Figure 2A:
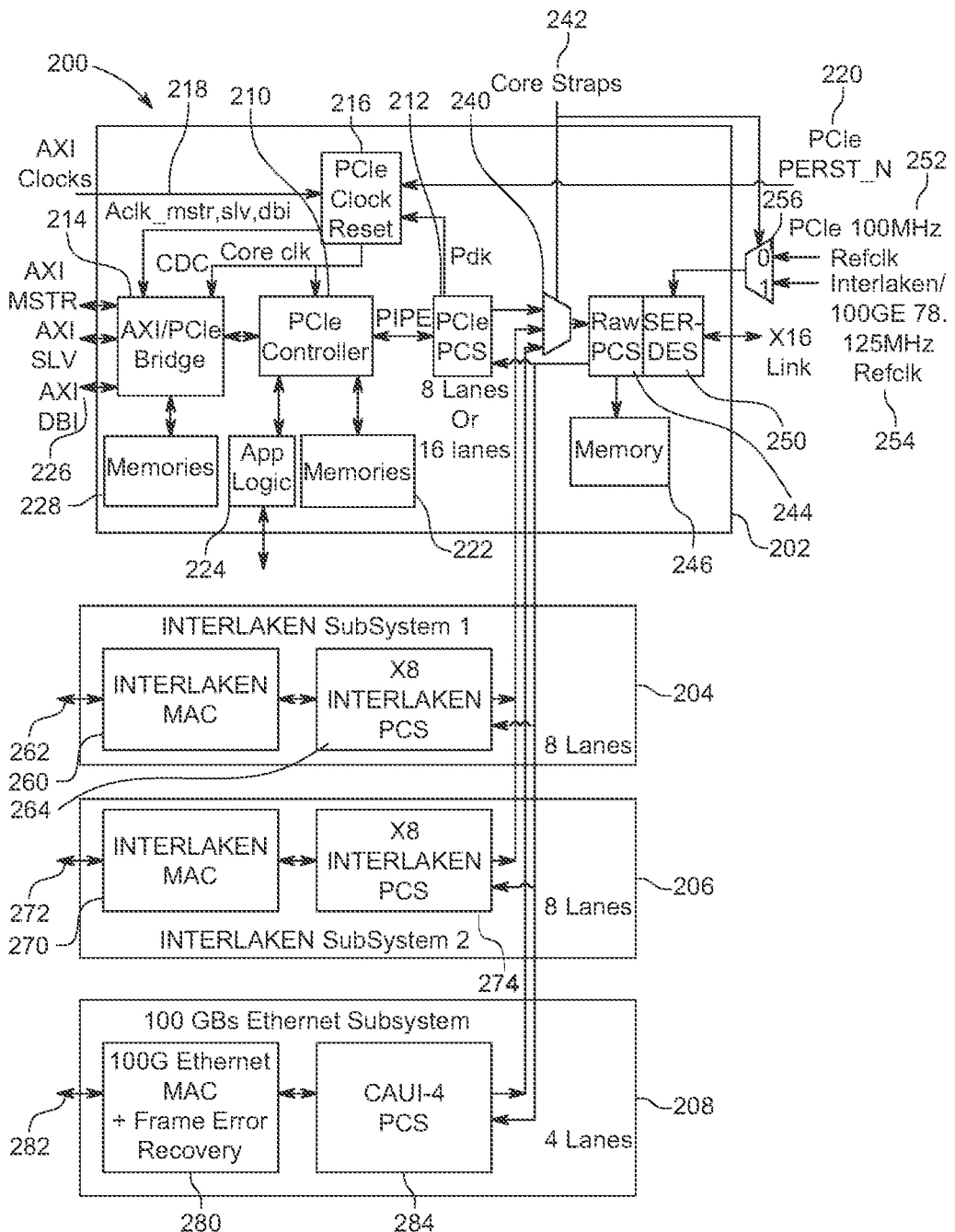
FIG. 2A is a block diagram of the SERDES control subsystem for one of the dies of the chip in FIG. 1A.

FIG. 2A is a block diagram of an example SERDES data interconnection subsystem 200 that allows the use of the SERDES lanes on the die 102 of the chip 100 for multiple different communication protocols, such as the PCIe, CAUI-4 (100 Gbps Ethernet), and Interlaken protocols for communication with devices external to the chip 100. As explained above the straps mode input determines the allocation of the SERDES lanes by the subsystem 200. In this example, the mode input pins are set for the configuration of the die 102. It is to be understood that the other dies 104, 106, and 108 have an identical data interconnection subsystem that is configured by the respective straps mode input in FIG. 1B. The SERDES lanes may have variable speeds such as 1/4/8/16/28/32/112/500/1000 Tbits that may be set by the subsystem 200.

Figure 2B:
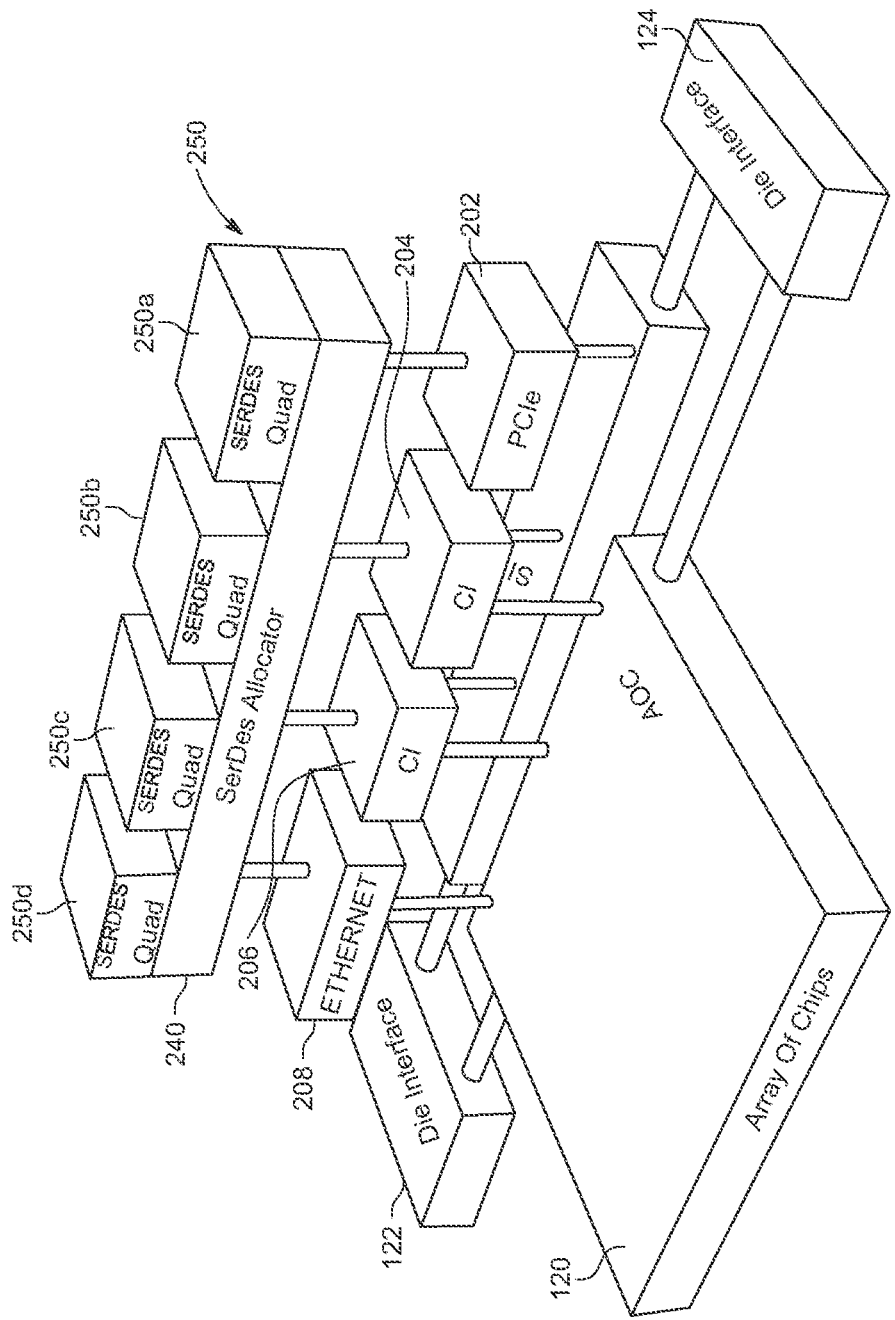
FIG. 2B is a perspective view of the components of the SERDES control subsystem of the die in FIG. 2A.

FIG. 2B is a perspective view showing the relationship between the different components of the subsystem 200 in relation to an array of cores 120 on the die 102. In this example, the array of cores 120 may communicate to external devices off the chip via the different protocols. The cores 120 communicate with other dies through die interfaces 122 and 124.

The subsystem 200 includes a PCI control subsystem 202, an Interlaken control subsystem 204, another Interlaken subsystem 206, and a 100 Gbps Ethernet control subsystem 208. As will be explained, a user may select one, two or all three of the protocols and their corresponding control subsystems 202, 204, 206, and 208. In this example, any of the control subsystems 202, 204, 206, and 208 not used in a specific configuration are powered down to conserve power consumed by the die 102. In this example, the SERDES interconnections are a sixteen lane interconnection. As will be explained, certain of the communication protocols will use all sixteen lanes, while others will use less than sixteen lanes. The unused lanes may be allocated to another protocol or may be unused.

The PCI control subsystem 202 includes a PCIe controller 210, a PCIe protocol coding sublayer (PCS) 212, and an Advanced eXensible Interface (AXI)/PCIe bridge 214. A PCIe clock and reset circuit 216 has inputs from an AXI clock line 218 and a PCIe PERST_N line 220. The clock and reset circuit 216 provides clock signals to the PCIe controller 210, the protocol coding sublayer 212, and the (AXI)/PCIe bridge 214. The PCIe controller 210 is coupled to a memory 222 and application logic 224. The PCIe controller 210 performs format encoding, error handling, and PCIe communication functions. The AXI/PCIe bridge 214 has an AXI interface 226 that receives Master (MSTR), Slave (SLVE), and DBI input signals from the cores on the die 102 if configured for PCIe. The AXI/PCIe bridge 214 is coupled to a memory 228. The master input signal lines of the AXI interface 226 are used by external devices to read or write data to the cores on the die 102, the slave input signal lines of the AXI interface 226 are used by local cores or controllers on the die 102 to read or write data from a host processor memory connected to the other end of the PCIe link, and the DBI input signals of the AXI interface 226 are used to access registers on a controller.

The PCIe PCS 212 provides an input to a data router 240, which may be a multiplexer. The outputs of the data router 240 are selected by a core strap input 242 that is the setting of the mode pin 112 in FIG. 1B. As will be explained the inputs that may be selected for the outputs of the data router 240 are the outputs of the protocol coding sublayers of respective different communications protocols such as the PCIe PCS 212. In this example, the inputs to the mode pin 112 are hardwired depending on the desired configuration of the die. Thus, in this example, the data router 240 may provide 16 combinations of outputs for the 16 SERDES lanes from the inputs. In this example, the inputs are 36 lanes of interconnections. The 36 lanes include inputs from the PCIe control subsystem 202 (16 lanes), the Interlaken control subsystems 204 and 206 (16 lanes) and Ethernet control subsystem 208 (4 lanes). The data router 240 is coupled to a raw protocol coding sublayer (PCS) 244. The raw PCS 244 is coupled to a memory 246 and interfaces with a set of SERDES interconnection lanes 250.

The SERDES interconnection lanes 250 provide communication with other components such as dies on other chips external to the chip 100 and other external components such as an FPGA, controller, ASIC, network interface, or storage device. As explained herein, the number of SERDES interconnection lanes in the set of SERDES lanes 250 is the maximum number of lanes required by the supported protocols. In this example, there are 16 lanes in the set of SERDES lanes 250 as the maximum number of lanes required are those for the PCIe protocol. As shown in FIG. 2B, the SERDES lanes 250 are organized in physical media attachments 250a, 250b, 250c, and 250d, that each have four lanes.

A 100 MHz clock input 252 for PCIe and a 78.125 MHz clock input 254 for Interlaken and Ethernet are connected to a multiplexer 256. The output of the multiplexer 256 is coupled to the SERDES lanes 250. The output of the multiplexer 256 is selected between the different clocks connected to the clock inputs 252 and 254 by the core straps input 242. As will be explained below, the higher and lower clock inputs 252 and 254 may be selected for higher and lower speed versions of one or more of the communications protocols.

The Interlaken subsystem 204 includes an Interlaken media access control (MAC) controller 260. The controller 260 is coupled to an Interlaken interface 262 with the components of the die 102. The controller 260 interfaces with an x8 Interlaken PCS 264 that has an output coupled to one of the inputs of the data router 240. The Interlaken controller 260 performs format encoding, error handling and Interlaken communication functions.

Similarly, the Interlaken subsystem 206 includes an Interlaken media access control (MAC) controller 270. The controller 270 is coupled to an Interlaken interface 272 with the components of the die 102. The controller 270 interfaces with an x8 Interlaken PCS 274 that has an output coupled to one of the inputs of the data router 240. The Interlaken subsystems 204 and 206 in this example may be set to a high speed Interlaken or low speed Interlaken but setting a clock for low or higher speed to provide either a 17.5 Gbps or 25 Gbps link.

The 100 Gbps Ethernet subsystem 208 includes an Ethernet MAC controller 280 that provides frame error recovery functions. The controller 280 is coupled to an Ethernet interface 282 from the die 102. The controller 280 interfaces with a CAUI-4 PCS 284 that has an output that is coupled to one of the inputs of the data router 240.

In this example, the subsystem 200 allows sharing of the SERDES interconnection lanes 250 between one of the three possible protocols that may be selected from the core straps input 242. In this example, when the PCIe protocol is selected, eight or sixteen of the sixteen lanes of the SERDES interconnection lanes 250 are used. The eight SERDES lanes are used for lower speed PCIe while the 16 SERDES lanes are used for higher speed PCIe. The selection of the PCIe type depends on the core straps input 242. When PCIe is selected the inputs from the AXI interface 226 are converted to PCIe signals by the PCIe bridge 214. The PCIe signals are processed by the PCIe PCS 212 and input to the raw PCS 244 to the SERDES interconnection lanes 250. In this example, the PCIe PCS 212 encodes the input data so it is encoded for the PCIe protocol on the link. The raw PCS 244 is operable for bit stream operation and performs equalization to remove interbit interference.

When the Interlaken protocol is selected, either or both of the Interlaken control subsystems 204 and 206 may be used to send data according to Interlaken protocols to and from the die 102 via the interfaces 262 and 272 to the SERDES interconnection lanes 250. Sixteen inputs of the data router 240 are connected to the respective PCS 264 and PCS 274 of the Interlaken subsystems 204 and 206. The respective controllers 260 and 270 use the PCS 264 and the PCS 274 process the input data to encode the data and send the encoded data to the raw PCS 244 for equalization. Either eight of the SERDES lanes 250 are used for one of the control subsystems 204 or 206, or all sixteen of the SERDES lanes 250 are used if both control subsystems 204 and 206 are active to create two different Interlaken channels. Either of the Interlaken control subsystems 204 and 206 may output the Interlaken signals in a high speed Interlaken format or a low speed Interlaken format.

When the Ethernet protocol is selected, the Ethernet control subsystem 208 may be used to send data via Ethernet protocols to and from the die 102 via the interface 282 to the SERDES interconnection lanes 250. The Ethernet data signals may be exchanged through the interface 282 to the SERDES interconnection lanes 250. Signals to and from the die 102 are sent through the interface 282 to the Ethernet MAC controller 280. The PCS 284 provides a coded input through four inputs of the data router 240 to the raw PCS 244 to provide signals to four of the SERDEs interconnection lanes 250. The Ethernet MAC controller 280 performs format encoding, error handling, and Ethernet protocol communication functions. It is to be understood that the principles descried herein may be extended to any number of different protocols that may share the SERDES interconnection lanes 250. For example, Quick Path Interconnect (QPI, Intel Version), Infiniti Fabric (AMD) high speed serial connection, NV Link (Invidia) chip to chip communication or Universal Chiplet Interconnect Express (UCIE) SERDES Interconnection 2.5/3D protocols may be used with corresponding subsystems and allocated SERDES lanes in addition or in place of any of the example PCIe, Ethernet, or Interlaken protocols.

Figure 3A:
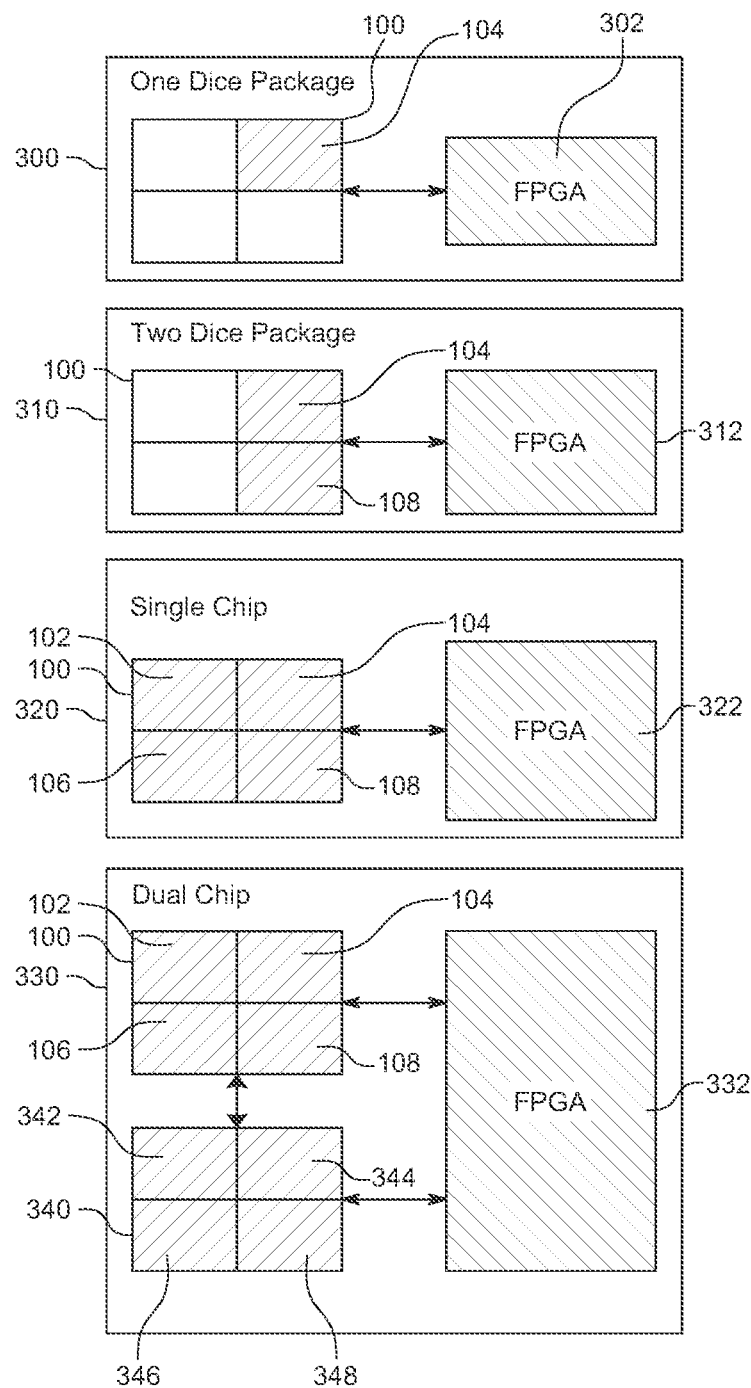
FIG. 3A shows different PCIe adaptor board designs that may use different dies of the quad die chip in FIG. 2A.

FIG. 3A shows different design configurations for the chip 100 in single dimension system level board designs for an example PCIe adapter board. Of course, FIG. 3A is only an example, and the dies on the chip 100 in additional to other similar chips may be employed in any variety of boards, devices, or other configurations according to the principles therein. FIG. 3A shows a first PCIe adaptor board design 300 using one die of the chip 100, a second PCIe adaptor board design 310 using two dies of the chip 100, a third PCIe adaptor board design 320 using all four dies of the chip 100, and a fourth PCIe adaptor board design 330 using eight dies (all of the dies on the chip 100, and all of the dies of a similar chip).

In the example PCIe adaptor board design 300, the chip 100 is connected to an FPGA 302. In this example, only one die 104 of the chip 100 is used in conjunction with the FPGA 302 for the example PCIe adaptor board design 300. As will be explained below, in this example, the interconnections between the die 104 and the FPGA 302 use the low speed Interlaken protocol and the corresponding SERDES lanes of the die 104 configured for low speed Interlaken protocol. In this example, the die 104 also may have an x8 PCIe interconnection and an Ethernet interconnection. The connections to the remaining unused dies 102, 106 and 108 are left unconnected.

In the example PCIe adaptor board design 310, two dies 104 and 108 of the chip 100 are used. The two active dies 104 and 108 are coupled to an FPGA 312 for the example PCIe adaptor board design 310. In this example, the die 104 also may have an x8 PCIe interconnection and an Ethernet interconnection. The connections to the remaining unused dies 102 and 106 are left unconnected.

In the example PCIe adaptor board design 320, all of the dies 102, 104, 106, and 108 of the chip 100 are used. All of the dies 102, 104, 106, and 108 on the chip 100 are connected either directly or indirectly to an FPGA 322.

The example PCIe adaptor board design 330 uses all the dies 102, 104, 106, and 108 of the chip 100 as well as another chip 340 that is identical to the chip 100. Thus, the chip 340 includes dies 342, 344, 346, and 348, that are all used in the example PCIe adaptor board design 330. As may be seen in the PCIe adaptor board design 330, the dies 102, 104, 106, and 108 of the chip 100 are interconnected with the dies 342, 344, 346, and 348 of the chip 340. As will be explained below, in this example, the interconnections between the dies of the two chips 100 and 340 use the high speed Interlaken protocol. The corresponding SERDES lanes of both connected dies are configured for high speed Interlaken protocol. All of the dies 102, 104, 106, 108, 342, 344, 346, and 348 are coupled either directly or indirectly to an FPGA 332.

Figure 3B:
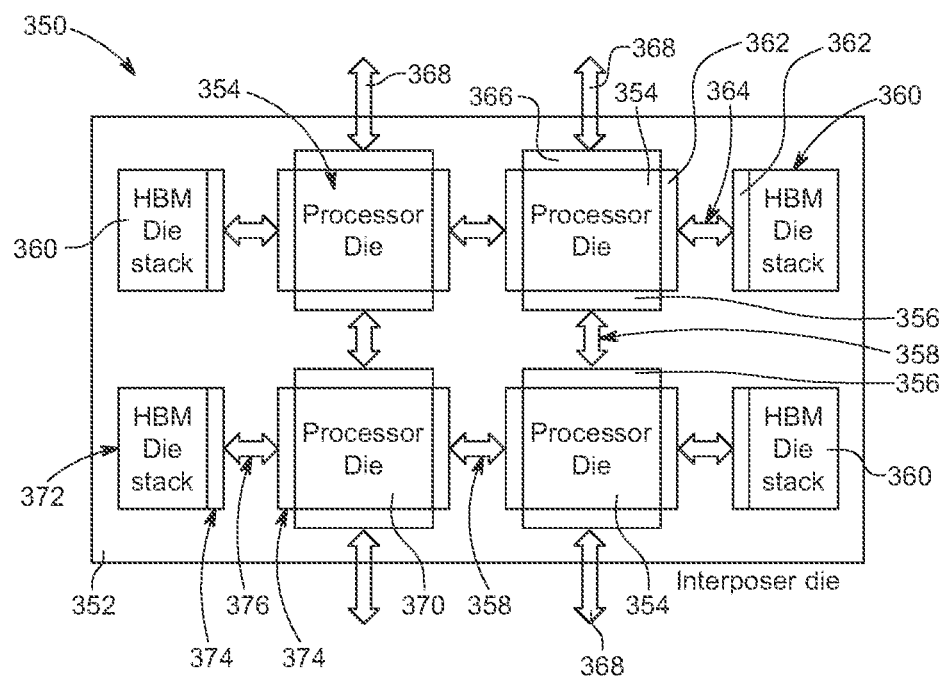
FIG. 3B shows a 2.5D integrated circuit package design that may use different dies and shared SERDES lanes.

FIG. 3B shows a 2.5D integrated circuit package design 350 that includes multi-processor dies and other components such as those in the die in FIG. 2A. The integrated circuit package design 350 includes a large "carrier" silicon die 352 and interposer die upon which all the other silicon dies of the integrated circuit package design 350 are placed upon. The die 352 has interfaces with all the dies as well as the external package input/output pins. The die 352 contains all the die to die interconnections as well. In this example, the die 352 has three identical multi-core processor dies 354. Each of the multi-core processor dies 354 have multi-protocol to SERDES and SERDES to Multi-Protocol interconnections 356 for communication between the multi-core processors 354. The interconnections 356 are coupled together by SERDES connections 358 at a first speed.

The die 352 also has several different high bandwidth memory (HBM) packages 360. Each of the HBM packages 360 is an example of a 3D package where multiple DRAM dies are stacked upon a base die. Each of the multi-core processors 354 also include different multi-protocol to SERDES and SERDES to multi-protocol connectors 362 for processor die to HBM communications. A series of SERDES connections 364 at different speed connect the connectors 362 of the HBM packages 360 and the multi-core processor dies 354. Each of the multi-core processors 354 also includes another set of different multi-protocol connectors 366 for SERDES to multi-protocol for package die to PCB board communications. SERDES connections 368 at a different speed provide board communications that are coupled to the connectior 366.

The die 352 also include another type of multi-core processor 370 that is a different type and/or has a different number of cores than the multi-core processors 354. A different type of HBM 372 such as HBM3 or HBM2 or HBM2e, etc. may also be used with the die 352 in this example. The multi-core processor 370 has a different protocol connector 374 (e.g., the HBM3 protocol) that is coupled to SERDES connections 376, that have a different SERDES speed from the SERDES connections 364.

Figure 3C:
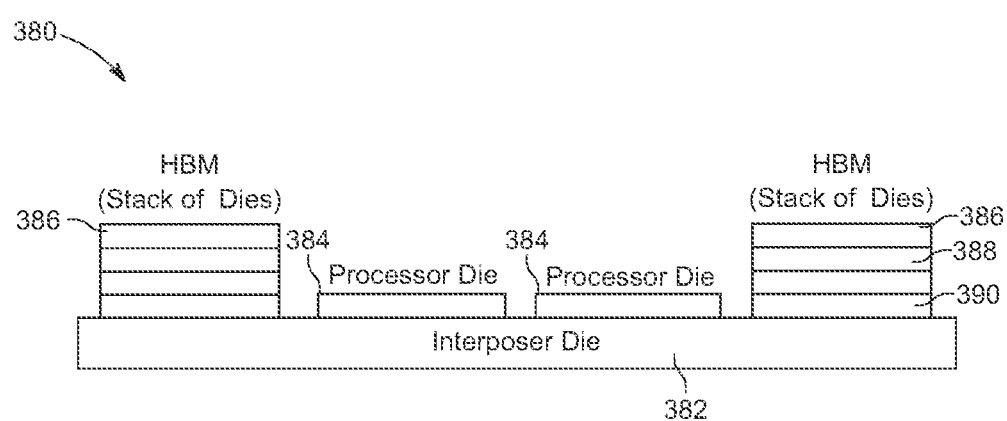
FIG. 3C shows a 3D configuration board design that may use different dies and shared SERDES lanes.

FIG. 3C shows a 3D configuration board design 380 that includes multi-processor dies and other components such as those in the die in FIG. 2A. The board design 380 includes a large "carrier" silicon die 382 upon which all the other silicon dies of the design 380 are placed upon. The die 382 serves as an interposer die and has interfaces with all the dies as well as the external package input/output pins. The die 352 contains all the die to die interconnections as well. In this example, the base die 382 has additional input/output circuitry. The base die 382 contains the SERDES lanes as well as the HBM protocol circuits and other components, which may drive/receive the SERDES lanes on the carrier die 382.

Each of a series of processor dies 384 are mounted on the carrier die 382. Each of the processor dies 384 contains multi-protocol interface connectors which drive the SERDES lanes. The processor dies 384 each contains connectors to/from processor die to processor die, to/from processor die to HBM 3D stack, and to/from processor die to external package input/outputs. In this example, there a series of HBM 3D stacks 386. Each of the stacks 386 are a 3D package where multiple DRAM dies 388 are stacked upon a base die 390.

Figure 4:
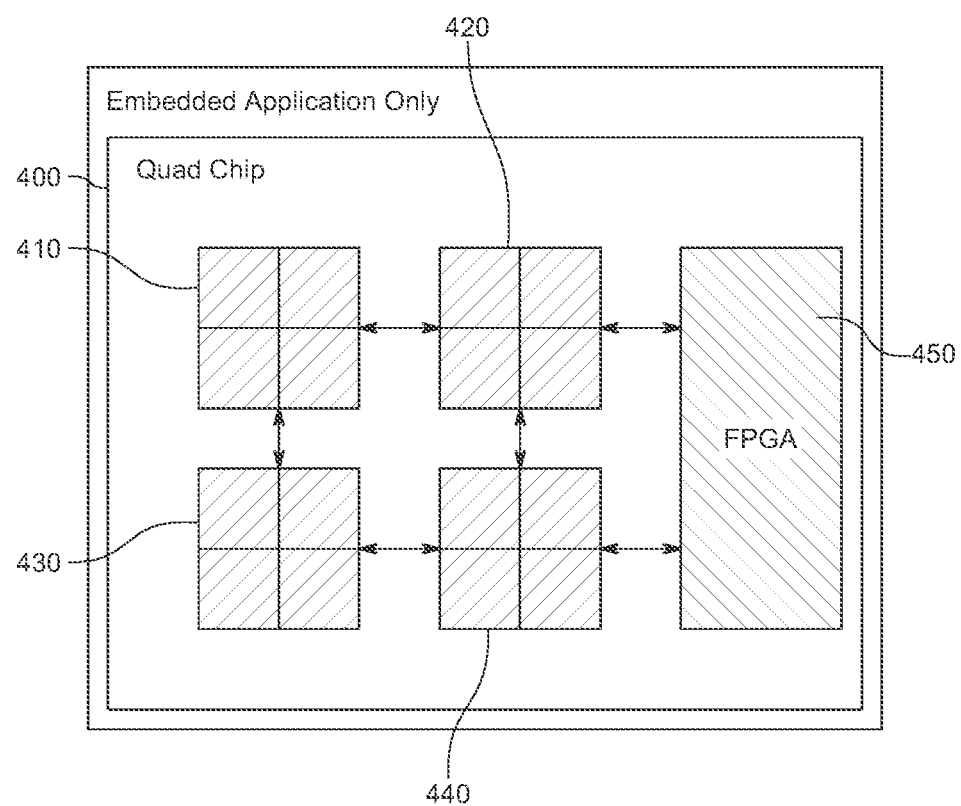
FIG. 4 is a PCIe adaptor board design using multiple quad die chips shown in FIG. 2A.

FIG. 4 shows a PCIe adaptor board design 400 that uses sixteen dies on four chips 410, 420, 430, and 440. Each of the chips 410, 420, 430 and 440 have four dies similar to dies 102, 104, 106, and 108 on the chip 100 in FIG. 1A. Each of the dies on the chips 410, 420, 430 and 440 are interconnected with the dies of the neighboring chips. For example, the dies on the chip 410 are directly interconnected with the dies on the chips 420 and 430. Communications with the dies on the chip 440 may be accomplished through either the chip 420 or the chip 430. The chips 420 and 440 have direct connections to an FPGA 450. The chips 410 and 430 may communicate with the FPGA 450 via one of the chips 420 and 440. As will be explained, all of the dies in the examples in FIGS. 3-4 have SERDES lines that may be used by any of three communications protocols that may be used to communicate with other dies, dies on other chips and other components, such as an FPGA.

As explained above, each of the dies in the designs shown in FIGS. 3-4 may have different communication configurations that are set by a four bit straps configuration input such as the SERDES mode input pin 112 to the die 102 in FIG. 1B. This allows up to 16 combinations of allocations of the 16 SERDES lanes in each die for different combinations of the communication protocols. Similar designs with additional SERDES lanes such as 32 SERDES lanes may employ the same principles. The configurations may also be provided through inputs other than the straps inputs such as through software.

FIG. 5A is a table 500 that shows example configuration modes of different protocols for the straps configuration input for the example dies of the chip 100 in FIG. 1A. A first column 510 shows the code for the mode input. Four columns 512, 514, 516, and 518 represent the physical media attachment (PMA) macros that each allocate four of the SERDES lanes of the sixteen SERDES interconnection lanes 250 in FIG. 2 to specific communication protocols. The example table 500 shows nine combinations of the three protocols for dies such as the die 102 on rows 530, 532, 534, 536, 538, 540, 542, 544, and 546. Of course, up to 16 configuration modes may be used with the table 500. Further, different configurations may be provided by changing the entries in the table 500 that correspond with a particular straps configuration input if such different configurations are desired.

Certain entries such as the entry (input 0000) 530 dedicate all 16 SERDES lanes 250 in FIG. 2 to one protocol such as PCIe. Similarly, the entry (input 0100) 538 dedicates all 16 SERDES lanes to two x8 Interlaken interfaces. Similarly, the entry (input 0110) 540 dedicates two sets of 4 SERDES lanes to two different Ethernet interfaces. Of course, other entries for the Interlaken interface and the Ethernet interface may dedicate appropriate SERDES lanes to a single interface and leave the rest of the SERDES lanes unused.

Other entries such as the entry (input 0001) 532 dedicate SERDES lanes to two protocols, such as four SERDES lanes to an Ethernet interface, and eight SERDES lanes to an Interlaken interface. In this example four of the SERDES lanes will be unused. Similarly, entry 542 (input 0111) dedicates 8 SERDES lanes to an Interlaken interface, and the 8 other SERDES lanes to a PCIe interface. Finally, entry 546 (input 1000) dedicates four SERDES lanes to a low speed Interlaken interface, four SERDES lanes to an Ethernet interface, and 8 SERDES lanes to a PCIe interface.

An additional mode configuration signal for signal reach may be input to the data router 240 in FIG. 2A. The data router 240 may then send the reach configuration mode signal to any of the PCSs of the communication subsystems such as the PCS 212 for PCIe, the PCS 264 for Interlaken, or the PCS 284 for Ethernet. At least some of the lanes of the set of SERDES interconnection lanes 250 allocated to the configured subsystems are thus configured for the selected reach. The additional mode configuration signal reach controls whether the PCS/SERDES combination have an ultra-short reach, a very short reach, a medium reach, a long reach or an ultra-long reach which allows tuning based on the distance the signals need to cover. This tuning allows the interconnect to be tuned to lower power dissipation and/or increasing the speed of the communications channel.

FIG. 5B shows a table 550 of the control status register bits set by the mode configuration reach signal to set the reach of the interconnections. The table 550 shows different configuration modes of the PCS/SERDES lanes for one of the dies of the quad die chip in FIG. 2A which configure/control the reach of the PCS/SERDES lanes 250. The table 550 includes a first column 560 that shows the reach mode pin and control status register bits. A second column 562 shows the corresponding reach. A third column 564 shows a general description of the desired reach setting. Thus, ultra-short reach is appropriate for 3D die packaging, very-short reach is appropriate for 2.5D packaging, medium reach is appropriate for intra-board package to package arrangements, long reach is appropriate for board to board or board to backplane arrangements, and ultra-long is appropriate for server to server or rack to rack arrangements.

Figure 6A:
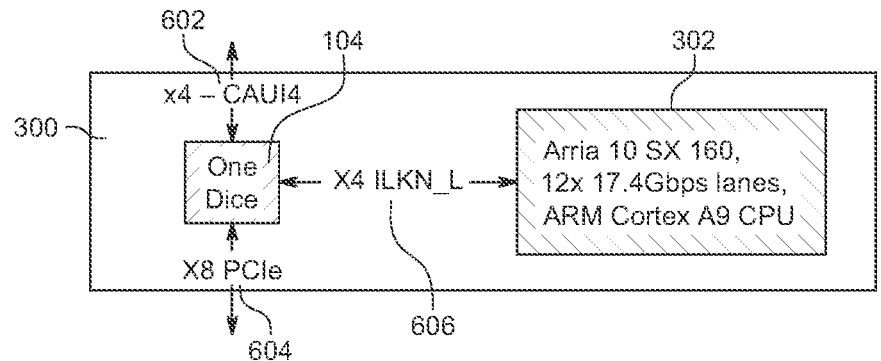
FIG. 6A-6E are SERDES configurations for dies in the example PCIe adaptor board designs in FIGS. 3 and 4.

FIG. 6A shows one example of a communication configuration with the example design 300 in FIG. 3 using the configuration modes for the SERDES lanes selected via entries such as the entries in the table 500 in FIG. 5A. In this example, the die 104 may communicate using the Ethernet protocol through four SERDES lanes 602 configured via the mode input pin 114 to the die 104 in FIG. 1B. The die 104 may communicate with external devices using the PCIe protocol using eight SERDES lanes 604. The die 104 communicates via eight SERDES lanes 606 with the FPGA 302 via the Interlaken protocol. In this example, the lanes 606 are configured for the low speed Interlaken interface running at 17.4 Gbps. The FPGA 302 in this example is an Aria 10SX160 FPGA with 12×17.5 Gbps lanes, and an ARM cortex A9 CPU.

Figure 6B:
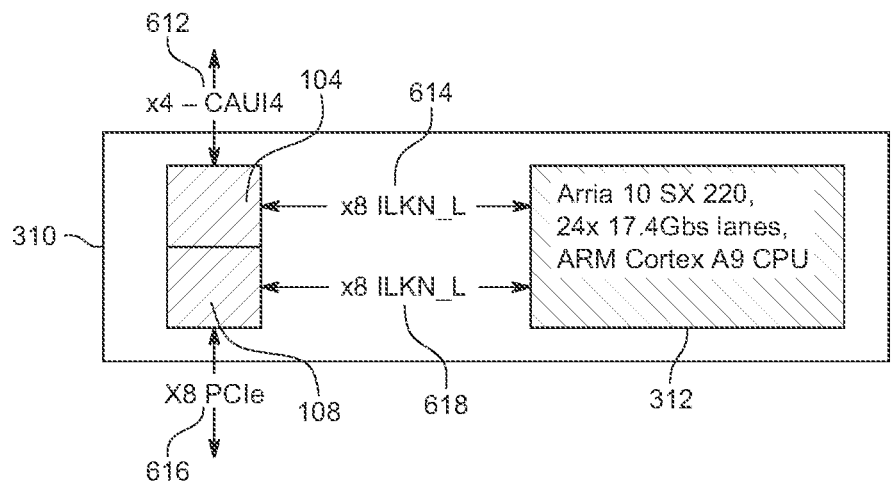

FIG. 6B shows one example of communication configurations with the example design 310 in FIG. 3 using the configuration modes for the SERDES selected via entries such as the entries in the table 500 in FIG. 5A. In this example, the die 104 may communicate with external nodes using the Ethernet protocol through four SERDES lanes 612 configured via the mode input. The die 104 communicates via eight SERDES lanes 614 with the FPGA 302 via the low speed Interlaken protocol. The die 108 may communicate to external devices using the PCIe protocol using eight SERDES lanes 616 configured via the mode input. The die 108 communicates via eight SERDES lanes 614 and 618 with the FPGA 302 via the low speed Interlaken protocol. In this example, the lanes 614 and 618 are configured for an Interlaken interface running at 17.4 Gbps. The FPGA 312 in this example is an Aria 10SX160 FPGA with 24×17.4 Gbps lanes, and an ARM cortex A9 CPU.

Figure 6C:
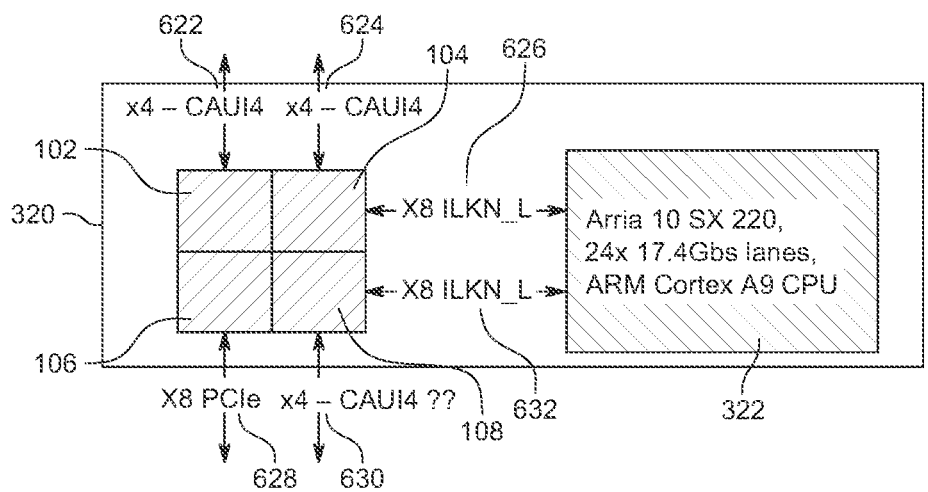

FIG. 6C shows one example of communication configurations with the example design 320 in FIG. 3 using the configuration modes for the SERDES that are determined by selection of table entries such as the entries in the table 500 in FIG. 5A. In this example, the die 102 may communicate using the Ethernet protocol to external nodes through four SERDES lanes 622 configured via the mode input pin 114 in FIG. 1B. The die 104 may communicate with an external node using the Ethernet protocol through four SERDES lanes 624 configured via the mode input. The die 104 communicates via eight SERDES lanes 626 with the FPGA 322 via the low speed Interlaken protocol. The die 106 may communicate to external devices using the PCIe protocol via eight SERDES lanes 628. The die 108 may communicate with external nodes using the Ethernet protocol through four SERDES lanes 630 configured via the mode input. The die 108 communicates via eight SERDES lanes 632 with the FPGA 322 using the low speed Interlaken protocol. In this example, the SERDES lanes 626 and 632 are configured for an Interlaken interface running at 17.4 Gbps. The FPGA 322 in this example is an Aria 10SX160 FPGA with 24×17.4 Gbps lanes, and an ARM cortex A9 CPU.

Figure 6D:
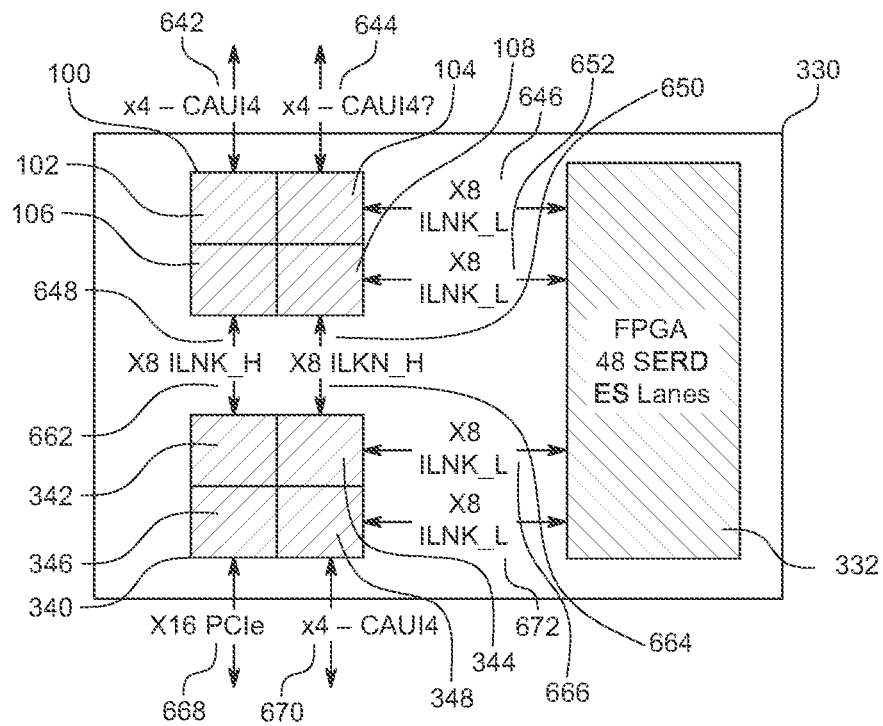

FIG. 6D shows one example of communication configurations with the example design 330 in FIG. 3 using the configuration modes for the SERDES lanes selected via entries such as the entries in the table 500 in FIG. 5A. In this example, the die 102 may communicate with external nodes using the Ethernet protocol through four SERDES lanes 642 configured via the mode input. The die 104 may communicate to external nodes using the Ethernet protocol through four SERDES lanes 644 configured via the mode input. The die 104 also communicates via eight SERDES lanes 646 with the FPGA 332 via the low speed Interlaken protocol. The die 106 may communicate to the die 342 on the chip 340 using the high speed Interlaken protocol using eight SERDES lanes 648. The die 106 may communicate to the die 344 on the chip 340 using the high speed Interlaken protocol via eight SERDES lanes 650. The die 108 communicates via eight SERDES lanes 652 with the FPGA 332 using the low speed Interlaken protocol. In this example, the SERDES lanes 646 and 652 are configured for an Interlaken protocol running at 17.4 Gbps. In this example, the SERDES lanes 648 and 650 are configured for an Interlaken protocol running at 25 Gbps. The FPGA 332 in this example has 48 SERDES lanes and is an Intel Aria 10SX570 with 48×17.4 Gbps lanes, and an ARM cortex A9 CPU.

Similarly, the dies 342, 344, 346, and 348 of the chip 340 are configured for different communication modes. In this example, the die 342 may communicate to the die 106 on the chip 100 using the high speed Interlaken protocol via eight SERDES lanes 648. The die 344 may communicate to the die 108 on the chip 100 using the high speed Interlaken protocol via eight SERDES lanes 664. The die 344 communicates via eight SERDES lanes 666 with the FPGA 332 using the low speed Interlaken protocol. The die 346 may communicate to external devices using the high speed PCIe protocol via sixteen SERDES lanes 668. In this example, the die 348 may communicate using the Ethernet protocol to external nodes through four SERDES lanes 670 configured via the mode input. The die 348 communicates via eight SERDES lanes 672 with the FPGA 332 using the low speed Interlaken protocol. In this example, the SERDES lanes 666 and 672 are configured for an Interlaken protocol running at 17.4 Gbps. In this example, the SERDES lanes 662 and 664 are configured for an Interlaken protocol running at 25 Gbps.

Figure 6E:
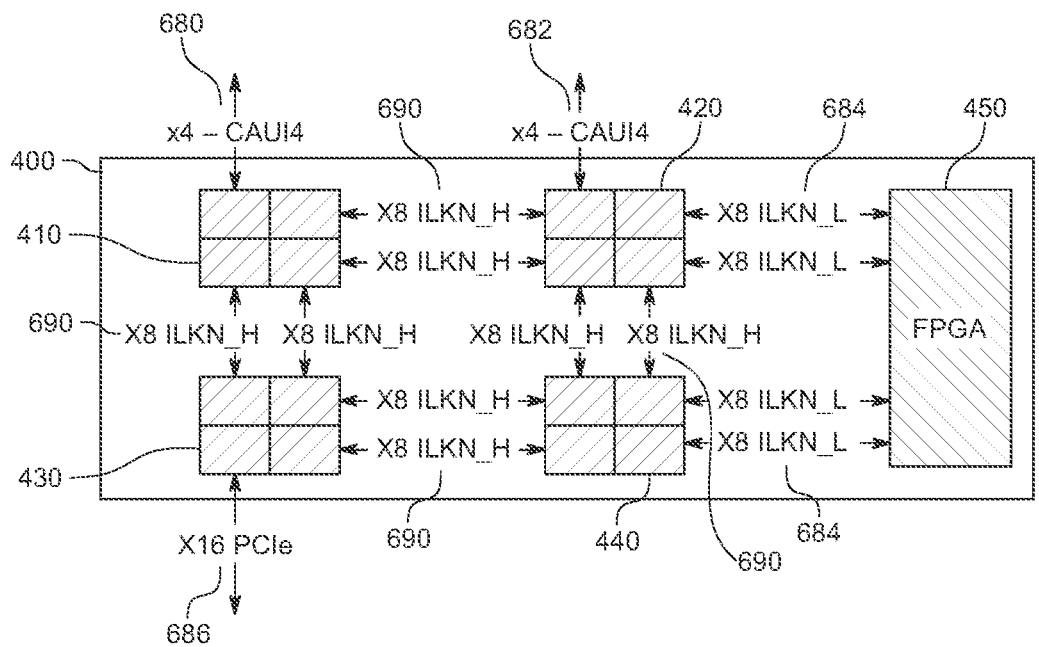

FIG. 6E shows one example of communication configurations with the example design 400 in FIG. 4 using the configuration modes for the SERDES lanes on the different dies on the four chips 410, 420, 430 and 440 via entries such as the entries in the table 500 in FIG. 5A. Dies on the chips 410 and 420 are configured to provide two Ethernet interfaces with dedicated sets of four SERDES lanes 680 and 682. Other dies on the chips 420 and 440 are configured to provide sets of eight SERDES lanes 684 to communicate with the FPGA 450 via the low speed Interlaken protocol. The FPGA 450 in this example is an Intel Aria 10 SX570 with 48 SERDES lines and an ARM cortex A9 CPU. One die on the chip 430 may communicate to external devices using the high speed PCIe protocol by configuring the sixteen SERDES lanes 686. Additional sets of eight SERDES lanes 690 provide communications via high speed Interlaken between dies bordering dies of other chips such as between chips 410 and 420, between chips 420 and 440, chips 410 and 430, and chips 430 and 440.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A die operable to access multiple communication protocols, the die comprising:
   at least one processing core;
   a set of serial interconnection lanes;
   a first communication subsystem including a first controller, a protocol coding sublayer (PCS) for interchanging data in a first communication protocol, and a data interface coupled to the at least one core;
   a second communication subsystem including a second controller, a PCS for interchanging data in a second communication protocol, and a data interface coupled to the at least one core;
   a third communication subsystem including a third controller, a PCS for interchanging data in a third communication protocol, and a data interface coupled the at least one core;
   a mode input configured to accept a plurality of different mode configurations and to select at least one of the first, second or third communication protocol, wherein a first mode configuration of the plurality of different mode configurations allocates some of the serial interconnection lanes to the data interface of the first subsystem communicating via the first protocol directed by the first controller, wherein the first mode configuration allocates some of the serial interconnection lanes to the data interface of the third communication subsystem communicating via the third protocol directed by the third controller, and wherein the first mode configuration powers down the second controller; and
   a data router having an input coupled to the PCS of the first communication subsystem and an input coupled to the PCS of the second communication subsystem, an output coupled to the set of serial interconnection lanes, and a selection input coupled to the mode input to allocate at least some of the lanes of the set of serial interconnection lanes for the selected protocol.

2. The die of claim 1, wherein the first, second, and third communication protocols are one of Interlaken, PCIe, Ethernet, Quick Path Interconnect (QPI), Infiniti Fabric high speed serial connection, NV Link chip to chip communication, or Universal Chiplet Interconnect Express (UCIE) 2.5/3D.

3. The die of claim 1, wherein the serial interconnection lanes are Serializer/Deserializer (SERDES) interconnections.

4. The die of claim 1, wherein a second mode configuration allocates some of the serial interconnection lanes to the data interface of the first subsystem communicating via the first protocol directed by the first controller, wherein the second mode allocates some of the serial interconnection lanes to the data interface of the second subsystem communicating via the second protocol, and wherein the second mode configuration allocates some of the serial interconnection lanes to the data interface of the third communication subsystem communicating via the third protocol directed by the third controller.

5. The die of claim 1, wherein the first mode configuration selects either a high speed version of the first protocol or a low speed version of the first protocol.

6. The die of claim 1, further comprising a table listing of the plurality of mode configurations and corresponding mode inputs.

7. The die of claim 1, further comprising a raw PCS coupled to the set of interconnection lanes operable to perform equalization to remove interbit interference.

8. The die of claim 1, wherein the selected set of interconnection lanes forms an interface to communicate the data signals of the first or second communication protocols to an external device.

9. The die of claim 1, further comprising a reach mode input allowing a reach configuration to set the selected PCS of the first communication subsystem or the PCS of the second communication subsystem.

10. A chip having a plurality of dies, each of the dies comprising:
- at least one processing core;
- a set of serial interconnection lanes;
- a first communication subsystem including a controller, a protocol coding sublayer (PCS) for interchanging data in a first communication protocol, and a data interface coupled to the at least one core;
- a second communication subsystem including a controller, a PCS for interchanging data in a second communication protocol, and a data interface coupled to the at least one core;
- a third communication subsystem including a third controller, a PCS for interchanging data in a third communication protocol, and a data interface coupled the at least one core;
- a mode input configured to accept a plurality of different mode configurations and to select at least one of the first, second or third communication protocol, wherein a first mode configuration of the plurality of different mode configurations allocates some of serial interconnection lanes to the data interface of the first subsystem communicating via the first protocol directed by the first controller and allocates some of the serial interconnection lanes to the data interface of the third communication subsystem communicating via the third communication protocol; and
- a data router having an input coupled to the PCS of the first communication subsystem and an input coupled to the PCS of the second communication subsystem, an output coupled to the set of serial interconnection lanes, and a selection input coupled to the mode input to allocate at least some of the lanes of the set of serial interconnection lanes for the selected protocol.

11. The chip of claim 10, wherein each die includes a table listing of the plurality of mode configurations and corresponding mode inputs.

12. A method of allocating a set of serial interconnection lanes on a die having at least one processing core between a first, a second, and a third communication protocol, the die including a first communication subsystem including a controller, a protocol coding sublayer (PCS) for interchanging data in a first communication protocol, and a data interface coupled to the at least one core; a second communication subsystem including a controller, a PCS for interchanging data in a second communication protocol, and a data interface coupled to the at least one core, and a third communication subsystem including a controller, a PCS for interchanging data in the third communication protocol, and a data interface coupled to the at least one core, the method comprising:
- inputting a mode configuration signal selecting from a plurality of different mode configurations to a data router having an input coupled to the PCS of the first communication subsystem, an input coupled to the PCS of the second communication subsystem, an input coupled to the PCS of the third communication subsystem, and an output coupled to the set of serial interconnection lanes;
- allocating at least some of the lanes of the set of serial interconnection lanes for the selected protocol according to a first mode configuration of the plurality of different mode configurations, wherein the first mode configuration allocates some of serial interconnection lanes to the data interface of the first subsystem communicating via the first protocol directed by the first controller, and wherein the first mode configuration allocates some of the serial interconnection lanes to the data interface of the third communication subsystem communicating via the third protocol directed by the third controller, and wherein the first mode configuration powers down the second controller; and
- exchanging data via either the controller of the first subsystem or the controller of the second subsystem or the controller of the third subsystem through the allocated lanes of the set of serial interconnection lanes with the processing core.

13. The die of claim 1, wherein a second mode configuration of the plurality of different mode configurations allocates all of the serial interconnection lanes to the data interface of the first subsystem communicating via the first protocol directed by the first controller.

14. The chip of claim 10, wherein the serial interconnection lanes are Serializer/Deserializer (SERDES) interconnections.

15. The chip of claim 10, wherein a second mode configuration allocates some of the serial interconnection lanes to the data interface of the first subsystem communicating via the first protocol directed by the first controller, wherein the second mode allocates some of the serial interconnection lanes to the data interface of the second subsystem communicating via the second protocol, and wherein the second mode configuration allocates some of the serial interconnection lanes to the data interface of the third communication subsystem communicating via the third protocol directed by the third controller.

16. The chip of 10, wherein a second mode configuration of the plurality of different mode configurations allocates all of the serial interconnection lanes to the data interface of the first subsystem communicating via the first protocol directed by the first controller.

17. The chip of claim 10, wherein the first mode configuration selects either a high speed version of the first protocol or a low speed version of the first protocol.

18. The chip of claim 10, further comprising a raw PCS coupled to the set of interconnection lanes operable to perform equalization to remove interbit interference.

19. The chip of claim 10, wherein the selected set of interconnection lanes forms an interface to communicate the data signals of the first or second communication protocols to an external device.

20. The chip of claim 10, further comprising a reach mode input allowing a reach configuration to set the selected PCS of the first communication subsystem or the PCS of the second communication subsystem.

* * * * *